March 23, 1965 H. N. HERSH 3,175,084
FREQUENCY CONVERTING DEVICE FOR ELECTROMAGNETIC RADIATION
Filed June 14, 1961 4 Sheets-Sheet 1
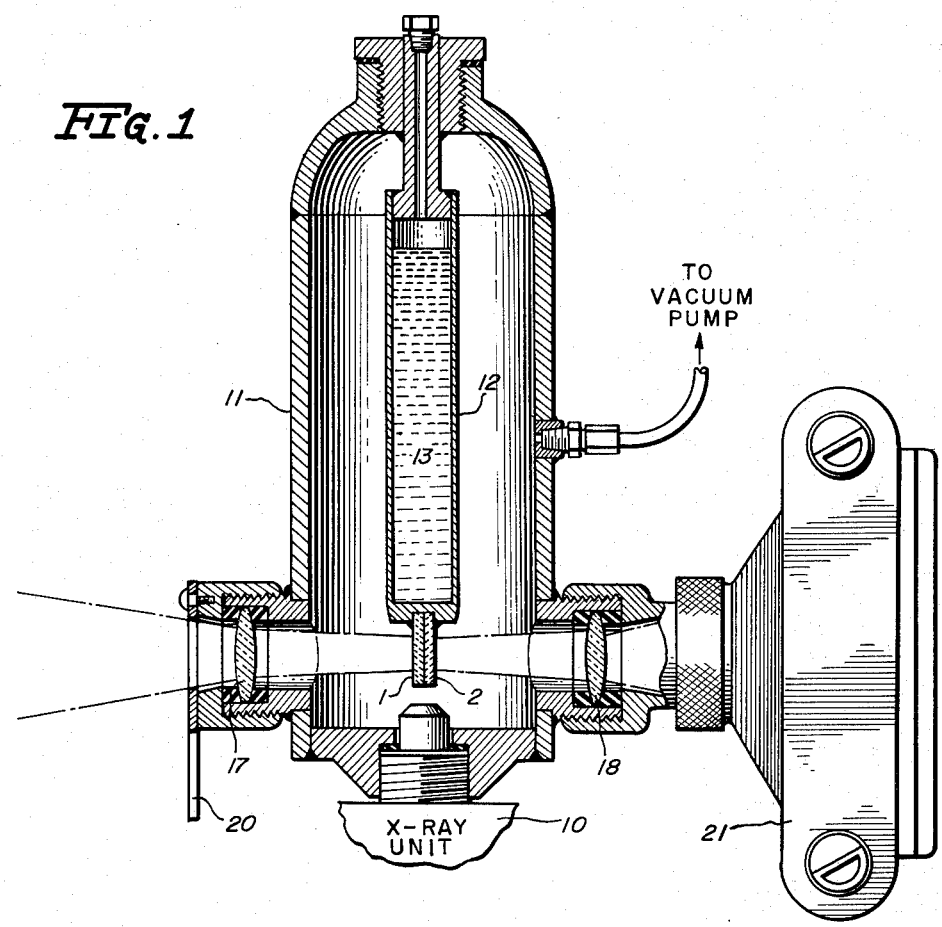
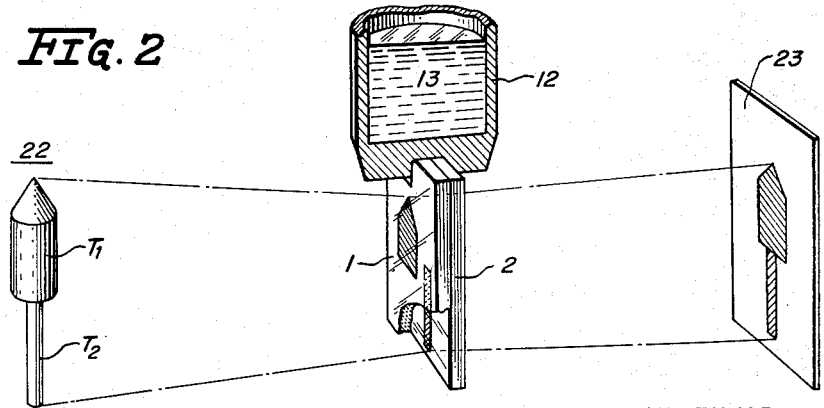
INVENTOR
Herbert N. Hersh
BY John J. Pederson
ATTORNEY March 23, 1965 H. N. HERSH 3,175,084
FREQUENCY CONVERTING DEVICE FOR ELECTROMAGNETIC RADIATION
Filed June 14, 1961 4 Sheets-Sheet 2
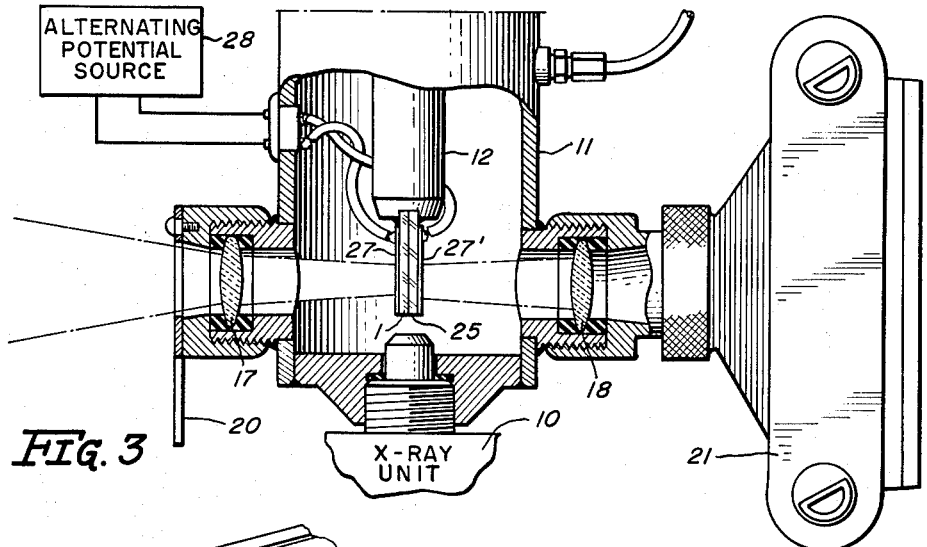
FIG. 3
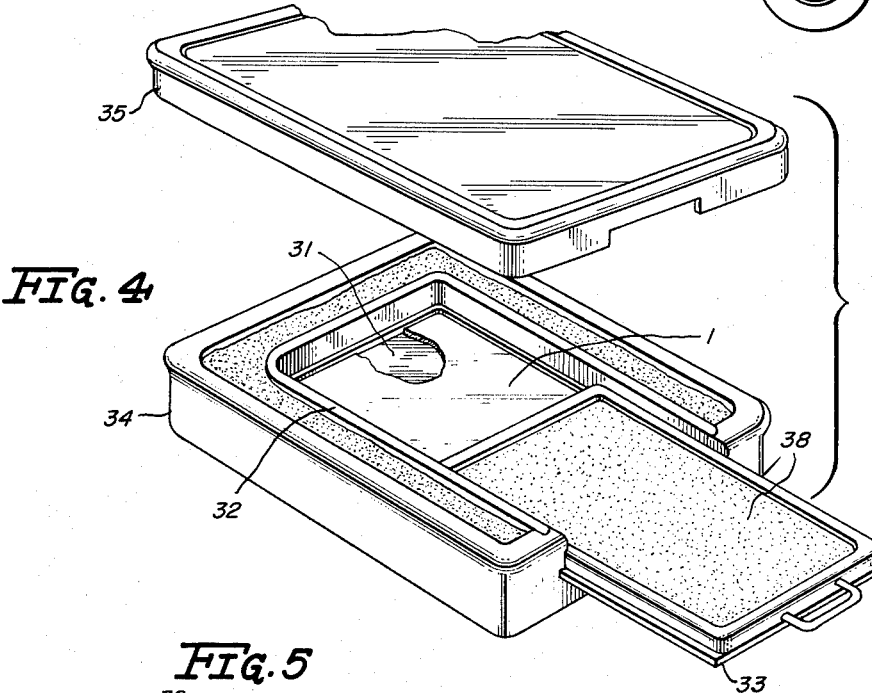
FIG. 4
FIG. 5
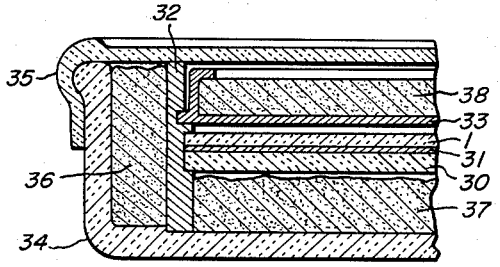
INVENTOR
Herbert N. Hersh
BY John J. Pederson
ATTORNEY March 23, 1965  H. N. HERSH  3,175,084
FREQUENCY CONVERTING DEVICE FOR ELECTROMAGNETIC RADIATION
Filed June 14, 1961  4 Sheets-Sheet 3

INVENTOR
Herbert N. Hersh
BY John J. Pederson
ATTORNEY

3,175,084
FREQUENCY CONVERTING DEVICE FOR ELECTROMAGNETIC RADIATION
Herbert N. Hersh, Skokie, Ill., assignor to Zenith Radio Corporation, a corporation of Delaware
Filed June 14, 1961, Ser. No. 117,164
17 Claims. (Cl. 250—83.3)

This invention relates to frequency converting devices for electromagnetic radiation and more specifically to devices for converting infrared and/or low-frequency visible radiation to visible radiation of a higher frequency.

Chemists, physicists and engineers have all been aware for many years of that portion of the electromagnetic spectrum known as the infrared. It lies, approximately, between wavelengths of 0.7 micron (the upper limit of the visible spectrum) and 1400 microns and it takes its name from the fact that its frequency is just under red in the visible spectrum. All objects whose temperatures are above absolute zero radiate a certain amount of infrared energy. In addition, as with visible light, infrared light is reflected from objects in varying degrees depending on the reflective properties of the materials of which such objects are made.

At the beginning of the Second World War, scientists and engineers were spurred on to greater efforts to develop both defensive and offensive implements of war and naturally turned to the infrared field. Some of the military uses of infrared are to detect heat sources, provide tracking information to help intercept such sources, present an image of a scene in terms of its infrared behavior (radiometry) and provide voice or data link communication. Missile guiding devices take advantage of the fact that the engines of airplanes, particularly in jet planes and missiles where the air friction increases the heat, radiate large amounts of infrared energy.

A military application developed in the Second World War was the "sniperscope" used by riflemen to detect the enemy under conditions of low visibility. The "sniperscope" consisted of an infrared-energy source and a rifle-mounted infrared-responsive electron tube image converter which sensed the infrared radiation reflected from objects illuminated by the source. A battery-operated high voltage D.-C. source powered the image tube which produced a visible image on its fluorescent screen.

Another war-time device was the "metascope" which used an infrared-stimulable alkaline earth metal sulfide phosphor laid down as a powder on a plaque. When exposed, this powder could directly reproduce an image of the object which was emitting or reflecting infrared radiation. However its clarity and distinctness were severely limited because of the scattering effect of the powder; in addition it had a rather limited infrared wavelength range. Furthermore the pictorial information given by both the metascope and the sniperscope were limited because of their lack of multicolor presentation.

Accordingly, it is a major object of this invention to provide an improved device for converting electromagnetic radiations within the visible and infrared wavelength range to electromagnetic radiations within a second, different, wavelength range.

In accordance with the invention, a device of the above type comprises an optically clear output screen composed of a crystalline wafer of stimulable material transparent to radiations within the second wavelength range and responsive to a predetermined irradiation to become sensitive to input radiations within the visible and infrared wavelength range. Means are also provided for subjecting the wafer to the predetermined irradiation to sensitize the screen and for exposing the sensitized screen to electromagnetic radiations within the visible and infrared wavelength range to convert the input radiations to output radiations within the second wavelength range.

More specifically, the invention provides an image converter for producing a visible image of an object emitting or reflecting infrared radiation. The converter is of the class comprising a phosphor screen subjected to a predetermined irradiation to excite the phosphor, thereby storing energy in the phosphor which is released in the form of visible light in response to stimulation by infrared radiation. This release of stored energy produces a visible image of the object. The screen is composed of an optically clear crystalline plate, transparent to visible light, of an infrared-stimulable phosphor.

In the prior art, infrared sensors inherently sensitive to the polarization of incoming infrared have been unknown, and it is another object of this invention to provide an improved, polarization-sensitive, infrared sensor. The above object is achieved by providing a novel process for making an infrared-sensitive phosphor wafer, which is inherently sensitive to the orientation of the electric vector characterizing a beam of incoming plane-polarized infrared radiation. The process comprises the steps of: one, subjecting the wafer to a predetermined irradiation to excite the wafer and two, irradiating the wafer with the plane-polarized infrared or visible light having its electric vector in the direction of the desired polarization to render the wafer insensitive to infrared irradiations having the above polarization and proportionately sensitive to polarized infrared having its electric vector angularly displaced from the aforesaid direction of polarization. Where the output screen is composed of a single grown crystal, the second step of the above process differs in that the single crystal must be polarized in one of its equivalent (011) or (001) direction axes.

Since a deficiency in prior art imaging devices was a lack of multi-color presentation, it is still another object of this invention to provide a device which produces a multi-color image in response to stimulation by energy within the infrared and visible wavelength range. In accordance with the invention, an image converter for producing a visible multi-color image of an object radiating or reflecting infrared radiation comprises a plurality of stacked infrared stimulable crystalline phosphor plates. Each of these plates has a different activator impurity which causes the spectral sensitivity to infrared irradiations of each of the above plates to be distinctive and also results in the formation of a composite image having a plurality of visible colors.

Another object of the invention is the provision of an improved infrared sensitive film. This aspect of the invention contemplates a film base containing a superposed layer of visible light sensitive material. An optically clear crystalline wafer transparent to visible light is in juxtaposition to the film base and is composed of a phosphor hose material from the group consisting of the alkalide metal halides and alkaline earth halides, activated with an element from any of the Groups I, II and III in the Periodic Table of Elements and sensitive to infrared irradiation to emit visible light thereby exposing the light sensitive layer.

A further object of the invention is the providing of an infrared and visible light amplifier. This device comprises a layer of luminescent material responsive to incident radiation of a first predetermined wavelength range to emit radiation of a second predetermined wavelength range higher in frequency than the first predetermined range. A layer of electroluminescent material is sandwiched against the luminescent layer and means are provided for applying a potential difference across the sandwiched layers. Finally there are means for exposing the luminescent layer to a source of radiation within the first predetermined wavelength range.

Another object of the invention is to provide an improved photon counter. In accordance with this objective, the photon counter comprises a luminescent segment extending along a predetermined axis and sensitive to electromagnetic irradiation within a first wavelength range to emit radiation within a second, higher, wavelength range. The intensity of the emission is proportional to the number of photons within the first wavelength range impinging on the segment. A pair of spaced reflectors intersect the axis of the segment and are located at its opposite ends, one of the reflectors being partially reflective for transmitting a portion of the radiation within the second wavelength range. Sensing means responsive to the above portion of radiation indicates its intensity.

Another field in which the invention finds use is radiology. It is an object of this invention to provide an improved radiological device. Accordingly, an output screen is provided composed of an optically clear crystalline wafer of stimulable material responsive to a predetermined irradiation to become sensitive to radiation within the infrared and visible wavelength range. In combination with the output screen are means for non-uniformly subjecting the wafer to such predetermined irradiation and means for exposing the wafer to radiation within the infrared and visible wavelength range. The wafer itself is transparent to radiations within such infrared and visible wavelength range.

The features of the present invention which are believed to be novel are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

FIGURE 1 is an elevational view, partially in section, of an image converter embodying the invention;

FIGURE 2 is a detail view of a portion of the apparatus of FIGURE 1;

FIGURE 3 is an elevational view, partly in section, of an infrared and visible light amplifier embodying the invention;

FIGURE 4 is an exploded view of an infrared film device embodying the invention;

FIGURE 5 is a partial sectional view of the device of FIGURE 4 in its assembled condition;

Figure 6:
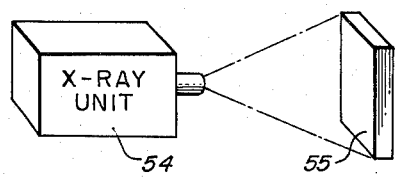
FIGURE 6 is a schematic representation illustrating a step of a novel polarization process in accordance with the invention.

An essential component of all embodiments of the invention is a wafer, plate, layer, or segment of a phosphor material which, when sensitized by a predetermined irradiation, is rendered stimulable by electromagnetic radiations within the visible and infrared wavelength range. This phosphor material may be taken from the group consisting of the alkali metal halides and alkaline earth halides and includes an impurity element from Groups I, II or III in the Periodic Table of Elements. For example, KCl:Ag, KI:Tl, and NaI:Tl give exemplary performance when used in the invention. Other examples are K, Na, and Rb combined with any one of the group comprising I, Cl, and Br and having a Hg, Ga, or In impurity element.

By definition, a phosphor is a material capable of lumi-nescence. Strictly speaking, luminescence is a process whereby matter generates non-thermal radiation which is characteristic of the particular luminescent material or, more broadly, it may be a process which includes excitation of the material, as for example with ultraviolet or X-rays, to effect a temporary storage of energy, and subsequent emission in response to stimulation by a predetermined irradiation which causes the stored energy to be released. An example of this type material is sodium iodide with .1 mole percent of thallium impurity. It may take the form of a single grown crystal, a compressed polycrystalline plate or wafer, or a granulated layer depending on its use.

Impurities largely determine the luminescence of phosphors. The impurity atom and its neighboring atoms in the crystalline wafer comprise the activator system the properties of which dominate photoluminescent excitation and emission. If a sodium iodide thallium activated crystalline wafer, for example, is first excited with ultraviolet or X-rays and then kept in a cold, dark environment, exposure of the wafer to infrared irradiation will release the ultraviolet or X-ray energy causing the wafer to emit a visible blue-violet light. Moreover in a more sophisticated arrangement, exposure of such a precharged crystalline wafer to an object emitting infrared will produce a visible image of that object on the crystal.

The crystalline materials of the type involved in this invention in reality act as amplifiers; i.e., the input to the wafer is infrared or visible light of a low frequency and the output is visible light of a higher frequency. This is really an energy amplification since the energy of one photon of frequency "$v$" is given by the relationship $E=hv$ where "h" is Planck's constant; since there is an up-conversion of frequency, there is actually an increase in energy. To supply this increase, excitation is necessary to store energy in the crystalline wafer. When this energy is dissipated by incident infrared radiation, the crystalline wafer of course needs to be recharged. Irradiation by X-rays or ultraviolet light may most conveniently be employed for the purpose of exciting the crystalline material, although other types of energy-imparting process may be used such as gamma ray irradiation or bombardment by ionizing particles such as neutrons or protons. Accordingly, the term "predetermined irradiation" is used herein in its broader sense to comprehend not only subjection to radiant energy, but also bombardment by ionizing particles such as neutrons or photons.

From a theoretical standpoint the excitation of the crystalline material generates electrons and holes which become trapped and form phosphorescent centers which give the crystal its useful infrared properties. Irradiating such "pumped" crystals with infrared or visible light causes a release of this stored energy as a result of electron-hole recombination. The volume or thickness of the crystalline material has an effect on the efficiency of the release of stored energy. As the length of travel of the incident infrared photons is increased through the material, there is a greater probability that a particular photon will "collide" with an energy storage center to release its stored energy. Hence it is desirable to dimension the crystals for as long a path of travel for photons as feasible.

Heating the "pumped" or excited crystal also releases energy. Therefore a "pumped" crystal must be kept in a cold environment free from either infrared or visible light.

As mentioned above, the impurity material present in a crystalline wafer largely determines its luminescent characteristics. From the standpoint of emission, the characteristic color of the impurity determines the emitted color; e.g., a blue-violet light is characteristic of thallium. In addition to color, the activator impurity determines the sensitivity of the wafer to stimulation by various frequencies of infrared and visible radiation. Each crystalline wafer or plate has its own characteristic curve of sensitivity versus wavelength. Thus, as in a resonant circuit in electronics, a crystal may be sensitive to a very limited range of frequencies or to a broad range of frequencies, depending on the impurity.

Besides its frequency sensitivity, a crystalline wafer is also sensitive to the intensity of the incident electromagnetic radiation. An increased intensity means that more photons per second are impinging upon the wafer and this in turn causes an increased rate of collisions and release of stored energy. Thus the visible light emitted by the wafer is intensified by the increase in intensity of the incident stimulating radiation. The properties of these crystalline materials are exploited in several devices which this application discloses and each will be described in detail.

A short discussion of the laws affecting the emissivity and reflectivity of a body is now in order. The first important factor of which to take cognizance is that relatively hot bodies radiate infrared in a more or less broad band of wavelengths. Wien's displacement law states that the wavelength of maximum radiation emittance is progressively displaced toward shorter wavelengths as the temperature of a black body increases. Practical evidence of this law is available in observing the color change of heated objects as their temperatures are raised, the color of the object gradually going from red, a long wavelength, at a relatively low temperature to blue and white, shorter wavelengths, at a higher temperature. From Wien's law it is apparent that a body with a plurality of temperature zones will emit a plurality of frequencies of infrared radiation.

Wien's displacement law was given in terms of black body radiation which is the maximum amount of radiation from hot bodies. Any deviation from a perfect black body naturally reduces the maximum radiation. From this information it is apparent that an object which is at a single temperature exhibits infrared radiation in a single frequency band of an intensity varying with its deviation from black body status.

In addition to emitting infrared radiation because of its temperature, a body may also reflect infrared. The material of which an object or body is composed determines two characteristics of reflection. First, if a source of infrared radiation is directed toward any given object, that object will reflect radiation with an intensity determined by the reflectivity of its surface. Thus a black body, by definition, is a perfect absorber of all incident radiant energy reflects no infrared radiation while a silvered body reflects a great majority of incident radiation. Secondly, if a multiple frequency infrared source is utilized to irradiate any given object, the same reflecting surface of a body will reflect the two different frequencies with intensities of different degrees, absorbing more of one frequency and reflecting more of another frequency. In other words, its reflecting properties are non-uniform over the frequency band; this is analogous to the incidence of sunlight on an object which absorbs all but a single frequency which it then reflects, giving the objects its characteristic color.

From the above discussion of emissivity and reflectivity it is clear that a detector which utilizes all of the information transmitted by infrared radiation will give an observer a detailed presentation of the object serving as the infrared radiator. Consideration will now be given to particular forms of infrared devices utilizing the properties of the infrared sensitive materials discussed above to provide improved detection of infrared radiation.

FIGURES 1 and 2 show a device for converting electromagnetic radiation within the visible and infrared wavelength range to electromagnetic radiations within a second, different, wavelength range. The device includes an output screen which is composed of two transparent crystalline wafers 1 and 2 of luminescent material responsive to X-ray irradiation by an X-ray unit 10 to become sensitive to visible and infrared radiation.

Crystalline wafers 1 and 2 are enclosed in a low-temperature optical cell to provide proper environmental conditions for their operation. An outer container 11, which may be constructed of Pyrex, brass, or stainless steel, for example, is silvered on the outside to reflect heat; in addition an internal opaque coating is provided to shield crystalline wafers 1 and 2 from visible light. All air is evacuated from the container to provide a vacuum insulation barrier for an inner container 12 which is suspended from the top of container 11. Container 12 is constructed of German silver or some other relatively poor thermal conductor and is filled with some type of liquid coolant, such as liquid nitrogen 13, to conductively cool crystalline wafers 1 and 2 which are suspended from, and in heat transferring relation to, the bottom of the container. Wafers 1 and 2 are either single grown crystals or compressed polycrystals and are substantially transparent. They are composed of a material from the group consisting of the alkali metal halides and alkaline earth halides and activated with an element from Groups I, II or III in the Periodic Table of Elements. In the present embodiment wafer 1 is a single grown crystal of sodium iodide doped with .1 mole percent of thallium impurity and wafer 2 is of the same material but doped with .1 mole percent of lead impurity.

Outer container 11 also includes an input window 17 and an output window 18. Input window 17 has an optical lens to focus the image of an object on wafers 1 and 2 and in addition the lens serves as an infrared radiation filter allowing only infrared through the lens onto the crystals; thus all visible light is prevented from entering container 11. A shutter 20 is provided to expose crystals 1 and 2 to an object emitting or reflecting infrared radiation when desired. Shutter 20 may be of a simple disc shape with an off-center aperture which is manually movable in front of window 17. Output window or lens 18 is coupled to a camera 21 of standard operation and design. The window focuses any visible light image appearing on the crystals on film in the camera. Of course, an image converter tube or the human eye itself may be used in place of the camera to detect the visible image.

The operation of the device of FIGURE 1 is shown more clearly in the detail view of FIGURE 2 where an object 22 is emitting infrared radiation which is focused on wafers 1 and 2 and the resultant visible image focused on a film 23. Object 22 represents a typical infrared source and in the present embodiment is a component of a soldering gun having a tip portion at a temperature $T_1$ and a second portion at a temperature $T_2$. Temperature $T_1$ is higher than temperature $T_2$ and therefore, according to Wien's displacement law, the body portion at temperature $T_1$ emits a higher frequency of infrared radiation than the portion at the lower temperature $T_2$. As previously explained, the activator impurity of an infrared sensitive material largely determines its sensitivity and in the arrangement of FIGURES 1 and 2 the thallium and lead impurities of crystals 1 and 2, respectively, produce a frequency sensitivity to infrared which coincides with the frequency of infrared radiation produced by the $T_1$ and $T_2$ temperature portions respectively.

The impurity in the crystals also determines the characteristic colors which the crystals emit in response to stimulation by the proper infrared radiation which are blue-violet for thallium and yellow for lead.

In operation, crystals 1 and 2 are first excited by X-ray unit 10 to place them in an infrared stimulable state. As mentioned above, various forms of ionizing radiation or bombardment by ionizing particles may be used to excite the crystals. In the present case satisfactory excitation was achieved using a typical industrial X-ray unit with 140 kilovolts peak at 4 milliamperes. The duration of irradiation varies with the amount of excitation desired, the time ranging from less than a second to a maximum of 5 to 6 minutes. Lower energy X-rays may also be used if exposure time is increased. The direction of irradation is not critical.

Movement of shutter 20 exposes crystals 1 and 2 to infrared radiations from object 22. Crystal 1 is predominantly responsive at $T_1$ and has slight if any response at $T_2$. Similarly crystal 2 is predominantly responsive at $T_2$ and has slight if any response at $T_1$. Therefore, the dominant image of the $T_1$ portion is on crystal 1 and the dominant image of the $T_2$ portion is on crystal 2. After exposure to infrared radiation from the object the image develops almost instantaneously. Thus the device of FIGURE 1 is an image converter which forms a composite image of an object emitting or reflecting infrared having a plurality of visible color values. Camera 21 is actuated to expose film 23 to record the visible image.

The image converter of FIGURE 1 may also perform satisfactorily using only a single crystalline wafer similar to wafer 1. The impurity content of the wafer may be selected to achieve a substantial sensitivity over a range including the frequencies of infrared radiation emitted by the $T_1$ and $T_2$ portions of object 22. Thus the entire image of the object would be produced on the single crystal. While the infrared information contained by this single crystal image yields one color, crystal 1 still produces a shaded image due to both variations in intensity of the emitted infrared and the unequal frequency sensitivity of the crystal to the $T_1$ and $T_2$ frequency ranges.

An object emitting red visible light may also be detected by the device of FIGURE 1 by modifying the crystalline wafer's frequency sensitivity and the acceptance band of filtering window 17 to accommodate visible light.

Image converters embodying the invention, as for example the type disclosed in FIGURES 1 and 2, exhibit distinct and important advantages over prior art infrared-sensitive devices such as the metascope. The frequency response of the metascope to infrared radiation is inherently limited to wavelengths of about 1.3 microns or less, which is the maximum response obtainable with the sulfide phosphors used; hence such devices are not applicable to detection or conversion of infrared signals or images at longer wavelengths. Another disadvantage of the metascope is attributable to its use of a powdered form of phosphor; the multitude of crystals causes diffuse scattering of light and results in poor image resolution. Other prior art devices have achieved improved resolution and frequency response compared to the metascope but only by the use of complex and expensive scanning techniques.

In accordance with the invention, infrared detectors and image converters are provided in which the maximum frequency response of the imager to infrared radiation is as much as double that of the metascope; a maximum frequency response of 2.5 microns or more has been achieved. Moreover the substantially transparent single grown crystal or compressed polycrystal phosphor employed in the inventive devices eliminates diffuse scattering and reduces interface reflection to improve the resolution of the image by an order of magnitude as compared with that of the metascope; image reproduction of 1600-line quality or better may be achieved without the use of cumbersome, expensive and complex scanning devices.

In FIGURE 3 an infrared and visible light amplifier is shown which utilizes the optical cell of FIGURE 1 but has, in conjunction with a standard crystalline wafer 1, an electroluminescent wafer 25, the two wafers being superposed or sandwiched together. Transparent electrodes 27 and 27' are placed across the two wafers and are connected to a source of alternating potential 28. The electroluminescent wafer may be composed of copper activated zinc sulfide which will give satisfactory performance in conjunction with a potential source of 600 volts at 400 cycles per second. Crystalline wafer 1, in addition to exhibiting its photoluminescent properties of emitting visible blue-violet light in response to stimulation by infrared, also exhibits the property of photoconductivity; i.e., stimulation by infrared reduces the resistance of the wafer. Since the alternating potential is applied across wafers 1 and 25 in series, a reduction in the resistance of wafer 1 increases the potential applied to wafer 25, thereby causing an increase in the electric field established in the wafer. As is characteristic of electroluminescent wafers, the increase in electric field causes the wafer to luminesce or emit visible light. During quiescent conditions the high resistance of wafer 1 reduces the field across wafer 25 below a threshold level of visible emission.

In operation, the light amplifier of FIGURE 3 is exposed to an object reflecting or emitting infrared radiation by positioning of the aperture in shutter 20 in front of window 17. The infrared radiation from the object is focused on crystalline wafer 1 to produce an image to be observed or recorded by camera 21. At the same time, the electric field across wafer 25 increases in accordance with a pattern corresponding to the image to produce a visible image on wafer 25 of the object. The intensity of the image is determined by the amount the field exceeds the threshold level of the wafer. The two images reinforce each other giving a total amplified image which is sensed by camera 21. This image is much brighter compared to the image of FIGURES 1 and 2. Of course in the case of an object which is reflecting or radiating visible light the light amplifier works in the same manner.

Crystalline wafer 1 may also be utilized as an integral component of an infrared sensitive film as shown in FIGURES 4 and 5. The film comprises a film base 30 which may be a glass block such as used in the commercial photography field with a layer of visible light sensitive material 31 on the film base. Thus far a standard visible light film has been described. In order to produce an infrared sensitive film, crystalline wafer 1 is affixed to the film base. The film base, the layer of visible light sensitive material, and the crystalline wafer 1 are all held together by a metal frame 32 which also has a provision for a sliding blind 33 to prevent exposure of the layer of visible light sensitive material 31. The entire film assembly is contained in an insulated box 34 having a cover 35. Box 34 also contains strips of Dry Ice 36 and 37 which refrigerate crystal 1. In addition to the Dry Ice in the base of the box, Dry Ice 38 has also been placed in the sliding blind 33. Some other coolant such as liquid nitrogen may also be used.

As is true with the crystalline wafer 1 in FIGURE 1, the wafer is pre-charged by exposure to ultraviolet, X-rays or the like to store energy in it thus making it infrared stimulable. The pre-charging is most conveniently accomplished before the wafer is affixed to film base 30 with light sensitive layer 31 to prevent spoilage of the light sensitive layer by X-ray irradiation. However the pre-charging may be accomplished after affixing wafer 1 to film base 30 if light sensitive layer 31 is either properly shielded from X-ray radiations or placed on the film base at a later time. To use this infrared sensitive film in a camera, cover 35 must be removed and the remaining assembly inserted into a camera which has a specially made receptacle. When the infrared photograph of an object reflecting or radiating infrared is to be taken, the blind 33 is removed from in front of crystalline wafer 1 to expose the wafer and light sensitive material to the lens and shutter of the camera. The opening of the shutter then stimulates wafer 1 to emit a visible light image exposing the light sensitive layer. Since the crystalline wafer 1 loses its excitation energy when exposed to heat, the slide or blind 33 should only be removed for 5 or 10 seconds which of course is sufficient time to expose the infrared film to the object. The improved infrared film using the type of crystalline wafer specified extends the sensitivity to infrared greatly beyond the previous limit of approximately 1.3 microns which was imposed by the nature of materials previously used.

Figure 7:
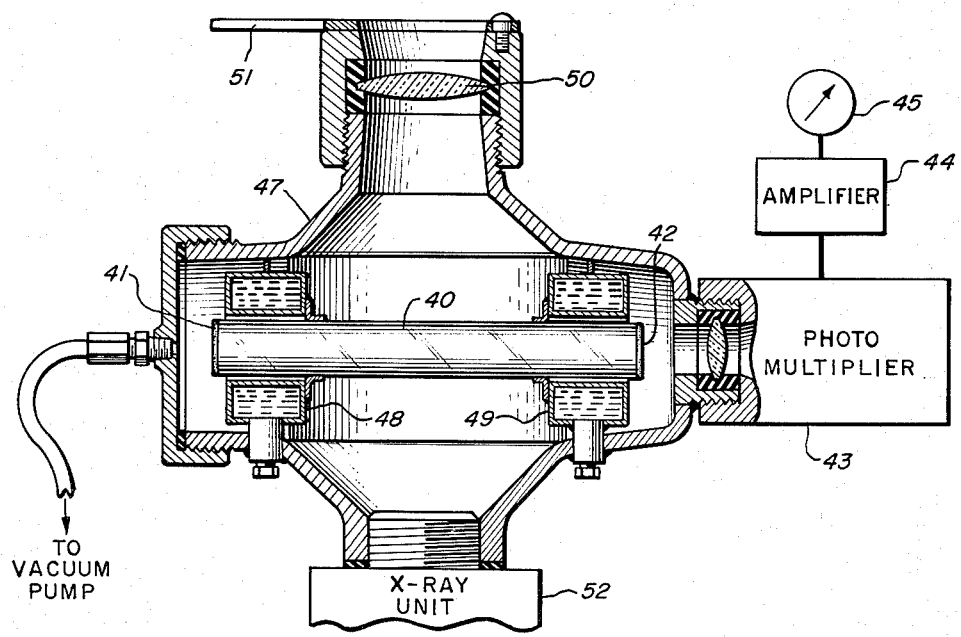
FIGURE 7 is an elevational view, partly in section, of a photon counter embodying the invention.

In FIGURE 7 another embodiment of the invention is shown which utilizes a rod-shaped crystalline segment 40 which may be cleaved from a single crystal. The device is a photon counter and comprises luminescent segment 40 oriented along a predetermined axis. It is sensitive to electromagnetic irradiation within a first wavelength range to emit radiation within a second, higher, wavelength range, the intensity of the emission being proportional to the number of photons within the first wavelength range impinging on the segment. More specifically in the embodiment of FIGURE 7, segment 40 which is composed of the same material as crystal 1 of FIGURES 1, 2 and 3 is sensitive to infrared radiation to emit visible light of a blue-violet color. As discussed in the introductory material, the greater the intensity of the incident infrared the greater the intensity of the resultant visible emission.

A pair of spaced reflectors 41 and 42 are deposited on the ends of segment 40. Reflector 42 is partially reflective to transmit a portion of the visible light to a photomultiplier 43, while reflector 41 is wholly reflective. Any light sensed by photomultiplier 43 is converted to an electrical potential, amplified by an amplifier 44 and fed to a meter 45 which indicates the magnitude of the amplified electrical potential.

The remaining portion of the photon counter of FIGURE 7 is constructed similarly to the optical cell of FIGURE 1 to provide the proper environmental conditions for the operation of crystalline segment 40. These include an outer container 47 to shield crystal 40 from visible light and also to retain a vacuum for insulation purposes. Inner containers 48 and 49 are filled with liquid nitrogen to cool the crystal to its required operating temperature. An infrared filter 50 prevents visible light from entering container 47 while a shutter 51 is used to expose segment 40 to the infrared radiation whose intensity or photon count is to be measured. Finally an X-ray unit 52 excites the segment to an infrared stimulable state as was done with crystal 1.

In operation, the crystalline segment 40 is exposed to the infrared source of radiation which is to be measured by the opening of shutter 51. The incident infrared stimulates the segment to emit visible light which is, of course, of a higher frequency than the infrared radiation. The visible light is reflected back and forth along the longitudinal axis of the crystalline segment by reflectors 41 and 42, reflector 42 transmitting a portion of this visible radiation to photomultiplier 43 which senses the intensity of the radiation. The function of the reflecting surfaces is to form an optical resonator to build up a light wave which is directed to a sensing device which in this case is photomultiplier 43. In this respect the photon counter is similar in operation to the Fabry-Perot interferometer. However instead of the incident light on the segment which is used in the Fabry device, the present device uses the internal light which is generated in response to infrared stimulation. Another distinction from the Fabry device is the up-frequency conversion from infrared to visible light which is required in the present embodiment.

Since the emitted visible light is proportional to the incident infrared, the light intensity meter reading is proportional to the number of photons of incident infrared.

Crystalline wafer 1 and segment 40 may also be polarized to render them insensitive to a predetermined polarization of infrared radiation. The method of polarization differs between a single grown crystal and a compressed polycrystal. The first step of the process is the same for both types and consists of precharging by subjecting the crystalline wafer to a predetermined irradiation or by bombardment with ionizing particles. This step is illustrated in FIGURE 6 where an X-ray unit 54 is irradiating a crystalline wafer 55.

The second and final step of the process for the single grown crystal plate consists of irradiating the crystal plate with plane-polarized infrared or visible light having its electric vector substantially parallel to a predetermined one of the equivalent (011) direction axes of the crystal plate. Single grown crystal plate 56 is shown in FIGURE 6b. The faces of the crystals are designated in standard crystallographic notation as (010) and (100). One of the (011) direction axes is shown by the arrow and designated as the $(0\bar{1}1)$ direction. In this case it is at a 45° angle to the crystal faces. The other direction axis (not shown) is normal to the $(0\bar{1}1)$ direction. An infrared or visible light source 57 is filtered by polarizer 58 to produce a plane-polarized light with its electric vector parallel to the $(0\bar{1}1)$ direction. Polarizer 58 includes a reference mark 58a which designates the direction of the electric vector of its polarized output. Entirely similar results may be obtained using plane-polarized light parallel to one of the equivalent (001) directions rather than the (011) directions.

From a theoretical standpoint the lattice structure of crystal plate 56 aligns the molecules of the crystal so that they interact only when exposed to a polarized light in one of the (011) or (001) directions. Slight deviation from one of these directions will still polarize in a reasonably effective manner but the efficiency drops off rapidly with deviation.

After crystal plate 56 is polarized it is wholly insensitive to polarized infrared having an electric vector parallel to its direction of polarization, maximally sensitive to polarized infrared having its electric vector perpendicular to such direction, and proportionately sensitive to polarized infrared having its electric vector angularly displaced from the above direction.

Figure 6A:
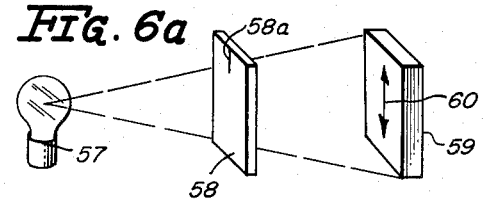
FIG. 6a is a schematic representation illustrating a further step in that process.
Figure 6B:
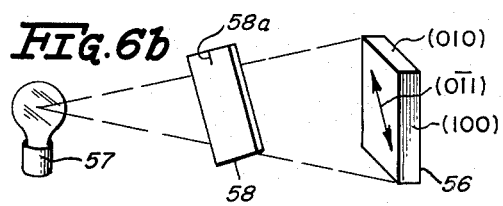
FIG. 6b is a similar representation of an alternative process step.

In FIGURE 6a a polycrystal 59 is being polarized. Here the polycrystal is irradiated with plane-polarized infrared or visible light having its electric vector in the direction of the desired polarization as indicated by arrow 60. Since the individual crystals of the polycrystal are randomly oriented the (011) direction axes need not be used. After polarization the polycrystal has the same properties as grown crystal 56.

Figure 8:
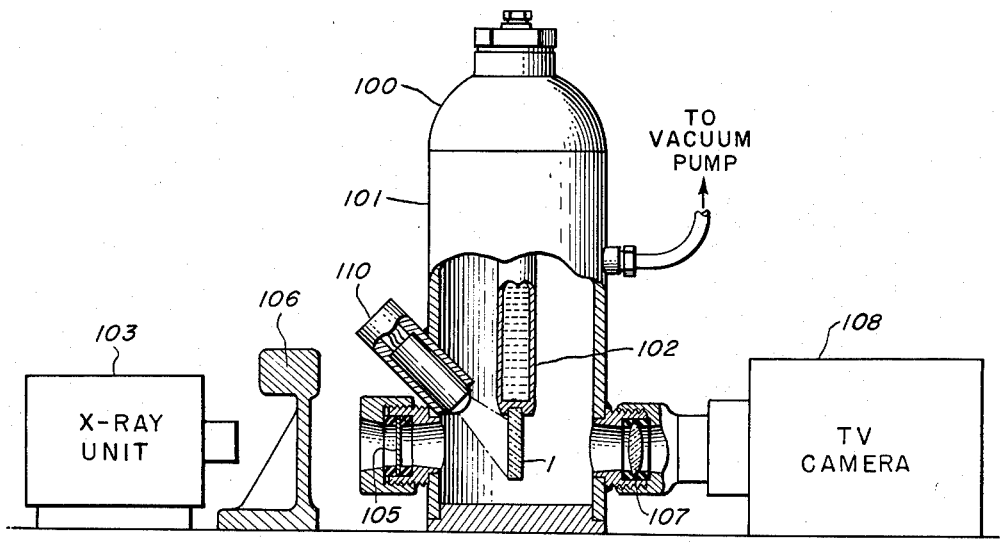
FIGURE 8 is an elevational view, partly in section of a radiological device embodying the invention.

Crystalline wafer 1 may also be used in radiological devices to improve their operating efficiency and sensitivity. In FIGURE 8 wafer 1 is shown in an optical cell 100 similar to the cell of FIGURE 1. An outer shell 101 of the cell is composed of an insulating and reflective material to shield wafer 1 from both heat and light. The wafer itself is retained at the end of a tube 102 which is filled with some coolant such as liquid nitrogen or helium. Wafer 1 is composed of a stimulable material responsive to irradiation by X-rays, gamma rays or the like to become sensitive to radiation within the infrared and visible wavelength range. The X-ray or gamma ray irradiation of the wafer stores energy in it which is later released when the wafer is exposed to radiation within the infrared and visible wavelength range. In FIGURE 8, the source of pre-charging radiation is represented by an X-ray unit 103.

Crystal 1 is subjected to X-rays from unit 103 by means of an input lens 105 composed of aluminum foil which freely passes X-rays but is opaque to visible and infrared radiation. X-rays from unit 103 also pass through an object such as a steel member 106, whose X-ray transmission characteristic is to be examined. An output lens 107 allows any visible light which is emitted by wafer 1 to be focused on the receiving tube of a television camera 108.

Means for exposing the wafer 1 to radiation within the infrared and visible wavelength range includes an infrared source 110 which is located in optical cell 100 to expose the entire face of wafer 1 to infrared radiation.

In operation, the device of FIGURE 8 acts as a flaw detector for object 106 which in this case is represented as a steel beam. When X-rays penetrate an object, the local X-ray attenuation depends on both the thickness and atomic number of the elements forming the object under scrutiny. Thus, the intensity pattern in the X-ray beam after penetration of the test object contains information concerning the structure of the object. More specifically, passage of X-rays from source 103 through the steel beam is affected by the thickness of the various parts of the structure and imperfections or flaws in the beam, the flaws scattering the X-rays differently from the rest of the object. Thus, the X-ray radiation which enters the input window and impinges upon wafer 1 is of non-uniform intensity and pre-stores non-uniform amounts of energy in crystal 1. Subsequent irradiation of the crystal by a flooding source 110 of infrared energy releases this stored X-ray energy and displays the non-uniform storage in a visible light pattern which is detected by the television camera 108. Inspection of the television picture thus reveals the X-ray transmission characteristic of object 106 revealing its flaws.

Of course, the device of FIGURE 8 may be used on an object such as the human body and function as a type of fluoroscopic device which gives the observing physician immediate information as to the X-ray transmission characteristic of a portion of the human body. The X-ray image may also be stored in crystal 1 for long periods of time, limited only by the characteristics of the refrigerating facility employed, for utilization by delayed irradiation by infrared energy.

Thus the invention discloses a frequency converter for converting infrared and/or low-frequency visible radiation to visible radiations of a higher frequency which has an informational yield many times that of prior art devices. An improved infrared and visible light amplifier utilizes the combined effects of the infrared frequency converter and an electroluminescent device. A relatively economical and improved infrared film has been developed. In the scientific measurement field, a photon counter with improved sensitivity has been disclosed. A novel method of producing an infrared polarization detector is provided. Finally, the invention discloses a radiological device with increased sensitivity and efficiency.

While particular embodiments of the invention have been described it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A device for converting electromagnetic radiations within a predetermined visible and infrared wavelength range to electromagnetic radiations within a second, different, wavelength range exclusive of said predetermined wavelength range comprising: an optically clear output screen composed of a crystalline wafer of stimulable material transparent to radiations within said second wavelength range and responsive to a predetermined irradiation to become sensitive to input radiations within said predetermined wavelength range; means for subjecting said wafer to said predetermined irradiation to sensitize said screen; and means for exposing said sensitized screen to electromagnetic radiations within said predetermined wavelength range to convert said input radiations to output radiations within said second wavelength range.

2. A device for converting infrared radiations to visible radiations comprising: an optically clear output screen composed of a crystalline wafer of stimulable material transparent to visible radiations and responsive to a predetermined irradiation to become sensitive to infrared radiations; means for subjecting said wafer to said predetermined irradiation to sensitize said screen; means for shielding said screen from visible light including means for exposing said screen to said infrared radiations; means for cooling said screen; and utilization means, sensitive to visible radiations, coupled to said output screen.

3. A device for converting infrared radiations to visible radiations comprising: an optically clear output screen composed of a crystalline wafer of stimulable host material from the group consisting of the alkali metal halides and alkaline earth halides, activated with an element from any of the Groups I, II, and III in the Periodic Table of Elements and responsive to irradiation by radiations in the electromagnetic spectrum including ultraviolet and X-rays to become sensitive to infrared radiations; means for subjecting said wafer to said irradiation to sensitize said screen; means for shielding said screen from visible light including means for exposing said screen to said infrared radiations; means for cooling said screen; and utilization means, sensitive to visible radiations, coupled to said output screen.

4. An infrared and visible radiation converting device of the type comprising a pre-irradiated phosphor screen responsive to infrared and visible radiations within a predetermined wave-length range to produce electromagnetic radiations within a second, different, wavelength range exclusive of said predetermined wavelength range, in which said phosphor screen is composed of an optically clear crystalline wafer transparent to radiations within said second wavelength range, said wafer being composed of a host material from the group consisting of the alkali metal halides and alkaline earth halides, activated with an element from any of the Groups I, II and III in the Periodic Table of Elements.

5. An image converter for producing a visible image of an object emitting infrared radiation of the class comprising a phosphor screen subjected to a predetermined irradiation to excite said phosphor thereby storing energy in said phosphor which is released in the form of visible light in response to stimulation by infrared radiation to produce a visible image of said object, in which said screen is composed of an optically clear crystalline plate, transparent to visible light, of an infrared stimulable phosphor.

6. A device for converting electromagnetic radiations within a predetermined infrared and visible wavelength range to electromagnetic radiations within a second, different, wavelength range exclusive of said predetermined wavelength range comprising: an optically clear crystalline output screen, transparent to radiations within said second wavelength range, composed of at least two luminescent materials having different activator impurities and responsive to a predetermined irradiation to become sensitive to respective electromagnetic radiations within predetermined different portions of said infrared and visible wavelength range; means for subjecting said screen to said predetermined irradiation to sensitize such screen; and means for exposing said sensitized screen to electromagnetic radiations within said infrared and visible wavelength range.

7. An image converter for producing a visible multicolor image of an object emitting infrared radiation comprising: a plurality of stacked infrared stimulable optically clear crystalline phosphor plates each plate having a different activator impurity whereby the spectral sensitivity to infrared irradiations of each of said plates is distinctive to form a composite image having a plurality of visible color values said plates being transparent to said visible colors.

8. A method of production of a polarization sensitive infrared stimulable grown crystal impurity activated phosphor plate comprising the following steps: subjecting said plate to a predetermined irradiation to excite such plate; irradiating said plate with plane-polarized light within the infrared and visible wavelength range having its electric vector substantially parallel to a predetermined one of the equivalent (011) or (001) direction axes of said crystal plate to polarize said plate to render it insensitive to polarized infrared having an electric vector parallel to said predetermined direction, maximally sensitive to polarized radiation having its electric vector perpendicular to said direction and proportionately sensitive to polarized infrared having its electric vector angularly displaced from said direction.

9. A method of production of a polarization sensitive infrared stimulable crystalline impurity-activated phosphor wafer comprising the following steps: subjecting said wafer to a predetermined irradiation to excite such wafer; irradiating said wafer with plane-polarized light within the infrared and visible wavelength range having its electric vector in the direction of the desired polarization to render said wafer insensitive to infrared irradiations having said polarization and proportionately sensitive to polarized infrared having its electric vector angularly displaced from said direction.

10. An infrared sensitive film comprising: a film base; a layer of visible light sensitive material on said film base; and an optically clear crystalline wafer, transparent to visible light in juxtaposition to said film base, said wafer being composed of a host material from the group consisting of the alkali metal halides and alkaline earth halides, activated with an element from any of the Groups I, II and III in the Periodic Table of Elements and sensitive to infrared irradiation to emit visible light thereby exposing said light sensitive layer.

11. An infrared and visible light amplifier comprising: a layer of luminescent material responsive to incident radiation of a first predetermined wavelength range to emit radiation of a second predetermined wavelength range higher in frequency than said first predetermined range; a layer of electroluminescent material sandwiched against said luminescent layer; means for applying a potential difference across said sandwiched layers; and means for exposing said luminescent layer to a source of radiation within said first predetermined wavelength range.

12. An infrared and visible light amplifier comprising: a layer of luminescent material responsive to incident radiation of a first predetermined wavelength range to emit radiation of a second predetermined wavelength range higher in frequency than said first predetermined range and in addition responsive to lower its electrical resistance in proportion to the intensity of said incident radiation; a layer of electroluminescent material sandwiched against said luminescent layer; means for applying a potential difference across said sandwiched layers; and means for exposing said luminescent layer to a source of radiation within said first predetermined wavelength range.

13. A photon counter comprising: a luminescent segment extending along a predetermined axis and sensitive to electromagnetic irradiation within a first wavelength range to emit radiation within a second, higher, wavelength range, the intensity of said emission being proportional to the number of photons within said first wavelength range impinging on said segment; a pair of spaced reflectors intersecting said axis and located at opposed ends of said segment, one of said reflectors being partially reflective for transmitting a portion of said radiation within said second wavelength range; and sensing means responsive to said portion of said radiation to indicate its intensity.

14. A photon counter comprising: a luminescent segment extending along a predetermined axis and sensitive to electromagnetic irradiation within the infrared wavelength range to emit radiation within a second, higher, wavelength range, the intensity of said emission being proportional to the number of photons within said infrared wavelength range impinging on said segment; a pair of spaced reflectors intersecting said axis and located at opposed ends of said segment one of said reflectors being partially reflective for transmitting a portion of said radiation within said second wavelength range; and sensing means responsive to said portion of said radiation to indicate its intensity.

15. In combination, an output screen composed of an optically clear crystalline wafer of stimulable material responsive to a predetermined irradiation to become sensitive to radiation within a predetermined infrared and visible wavelength range; means for non-uniformly subjecting said wafer to said predetermined irradiation; and means for exposing said wafer to radiation within said predetermined wavelength range, said wafer being transparent to radiations within said predetermined wavelength range.

16. In combination an output screen composed of an optically clear crystalline wafer of stimulable material responsive to predetermined irradiation within the ultraviolet, X-ray and gamma ray wavelength range to become sensitive to radiation within a predetermined infrared and visible wavelength range; means for non-uniformly subjecting said wafer to said predetermined radiation to store energy in said wafer; and means for exposing said wafer to radiation within said predetermined wavelength range to release a portion of said energy, said wafer being transparent to radiations within said predetermined wavelength range.

17. A device for examining the X-ray transmission characteristic of an object comprising: an optically clear output screen composed of a crystalline wafer of stimulable host material from the group consisting of the alkali metal halides and alkaline earth halides, activated with an element from any of the Groups I, II, and III in the Periodic Table of Elements and responsive to X-ray irradiation to become sensitive to radiation within a predetermined infrared and visible wavelength range; means for subjecting said wafer to said X-rays a portion of which have been attenuated by passage through said object; and means for exposing said wafer to said radiation within said predetermined wavelength range.

References Cited in the file of this patent
UNITED STATES PATENTS

| | | |
|---|---|---|
| 2,482,815 | Urbach | Sept. 27, 1949 |
| 2,644,096 | Fine | June 30, 1953 |
| 2,692,950 | Wallace | Oct. 26, 1954 |
| 2,837,657 | Craig et al. | June 3, 1958 |
| 2,920,205 | Choyke | Jan. 5, 1960 |
| 2,989,636 | Lieb | June 20, 1961 |
| 3,062,959 | Sclar | Nov. 6, 1962 |
| 3,085,154 | Kelsh | Apr. 9, 1963 |